United States Patent
Teather et al.

(10) Patent No.: US 9,394,440 B2
(45) Date of Patent: *Jul. 19, 2016

(54) SPRAYABLE NON-WOVEN FIBER WEED BARRIER

(75) Inventors: Eric William Hearn Teather, Elkton, MD (US); Roger Dobnikar, Pleasant Prairie, WI (US)

(73) Assignee: WhiteOptics LLC, New Castle, DE (US)

( * ) Notice: Subject to any disclaimer, the term of this patent is extended or adjusted under 35 U.S.C. 154(b) by 511 days.

This patent is subject to a terminal disclaimer.

(21) Appl. No.: 13/310,213

(22) Filed: Dec. 2, 2011

(65) Prior Publication Data

US 2012/0227646 A1  Sep. 13, 2012

Related U.S. Application Data

(60) Provisional application No. 61/419,399, filed on Dec. 3, 2010.

(51) Int. Cl.
| | |
|---|---|
| *A01M 21/04* | (2006.01) |
| *A01N 25/02* | (2006.01) |
| *A01P 13/00* | (2006.01) |
| *A01P 3/00* | (2006.01) |
| *A01P 7/04* | (2006.01) |
| *C08L 75/04* | (2006.01) |
| *A01G 13/00* | (2006.01) |
| *C08G 18/08* | (2006.01) |
| *D04H 1/732* | (2012.01) |

(52) U.S. Cl.
CPC ............. *C08L 75/04* (2013.01); *A01G 13/0262* (2013.01); *C08G 18/0866* (2013.01); *D04H 1/732* (2013.01); *A01G 2013/004* (2013.01)

(58) Field of Classification Search
CPC .... C08L 75/04; A01G 13/02; A01G 13/0237; A01G 13/0256; A01G 13/0268; A01G 13/0275; C08G 18/0866
See application file for complete search history.

(56) References Cited

U.S. PATENT DOCUMENTS

| | | | | |
|---|---|---|---|---|
| 4,856,650 A | * | 8/1989 | Inoue | 206/204 |
| 5,575,112 A | * | 11/1996 | Scheubel | A01G 9/10 47/58.1 R |
| 2002/0064628 A1 | * | 5/2002 | Carr | B64F 1/00 428/170 |

FOREIGN PATENT DOCUMENTS

WO    WO 2009/101545 A1 * 8/2009

OTHER PUBLICATIONS

Swicofil (http://www.swicofil.com/companyinfo/manualmonofilconversiontable.html, pp. 1-2, accessed on Sep. 17, 2015).*

* cited by examiner

*Primary Examiner* — Alma Pipic
(74) *Attorney, Agent, or Firm* — Young Conaway Stargatt & Taylor, LLP; James M. Lennon; Gregory J. Brodzik

(57) ABSTRACT

Disclosed is a sprayable nonwoven fiber weed barrier comprising an aqueous solution of nonwoven fibers and polymer binder. The aqueous solution can be directly sprayed onto the soil to suppress weed penetration through the soil. The sprayable nonwoven fiber weed barrier has a pore structure that allows water to penetrate into the soil, but curbs the growth of weeds.

7 Claims, No Drawings

SPRAYABLE NON-WOVEN FIBER WEED BARRIER

CROSS-REFERENCE TO RELATED APPLICATIONS

This application claims priority to U.S. Provisional Application for Patent Ser. No. 61/419,399 filed Dec. 3, 2010, the entire disclosure of which is incorporated herein by reference.

FIELD OF THE INVENTION

The present disclosure relates to the agriculture industry in general, and specifically to sprayable non-woven fiber weed barriers. Also disclosed is a method of suppressing weed penetration through soil comprising applying a sprayable non-woven fiber weed barrier to the soil.

BACKGROUND OF THE TECHNOLOGY

Weeds are undesirable plants that rapidly grow in gardens, planters, and lawns. Controlling and preventing weed growth is crucial to healthy plant maintenance. If not controlled, weeds can quickly overtake a lawn or garden, strangling desirable plants and blocking grass from receiving crucial sunlight.

Many types of products exist for controlling and preventing weeds; from selective herbicides (e.g. Weed-be-Gone), to complete herbicides (e.g. Round-up), to fiber barriers. Selective herbicides are effective at controlling and killing existing weeds, however, they do not prevent new ones from growing. Also, selective herbicides may also harm desirable, broadleaf, plants. Complete herbicides are extremely effective at killing anything green and temporarily prevent new weeds from growing. However, as the name suggests, complete herbicides will kill both weeds and desirable plants, thus, limiting their use.

Fiber barriers are nonwoven polymer fabrics also known as "landscape fabrics" or "geotextiles." These are typically UV stabilized and shrink proof polypropylene spunbound or meltblown nonwoven fabrics dyed black, brown, gray, or white and sold in rolls to contractors or retail stores. The main purpose of fabric is to suppress weed growth while allowing water, air, herbicides, fertilizer, and insecticides to flow into the soil. Weed control typically ranges from 1-15 years, depending on the quality of the barrier and how it is applied.

Weed barriers serve four significant functions: weed restriction, soil separation, reinforcement, and filtration. Additional advantages of weed barriers include: reduces watering, allows nutrients and air to permeate, reduces garden maintenance, promotes the growth of plant roots, minimizes erosion and loss of mulch due to soil intrusion, lower environmental impact than herbicides, long lasting weed control, and resists mildew, rotting, and insect invasion. Common locations for use include: golf courses, urban medians, residential homes, plant containers, and gardens.

U.S. Patent Application Publication 2006/0178272 discloses a spray-on weed blocking film made from a mixture of binding agent, wetting agent, dispersing agent, stabilizing agent, and a filler material. The filler material comprises powdered clay. Total solids in the mixture is between 40%-60% by weight mixture.

SUMMARY OF THE INVENTION

Unfortunately, fiber weed barriers also have several disadvantages, including expense, significant time and labor involved in applying, requires specialized people and equipment to install on a commercial scale, does not biodegrade, and can reduce the size of certain plants by restricting outward growth. Additionally, clay based sprayable weed barriers result in poor moisture transfer and must be applied in high volumetric densities. Therefore, it would be desirable to develop a fiber weed barrier that still provides long lasting weed control, but is easier and cheaper to apply. Further, it would be desirable to develop a sprayable weed barrier with improved moisture transfer than clay based barriers that can be applied at lower volumetric densities.

The present disclosure provides a fiber weed barrier that is easy to apply and controls the growth of weeds. In one aspect, a sprayable non-woven fiber weed barrier is disclosed comprising an aqueous solution of nonwoven fiber and polymer binder. The nonwoven fiber can be polypropylene, polyethylene, polyamide, polystyrene, or mixtures of these. The sprayable non-woven fiber weed barrier has better moisture transfer than clay based sprayable weed barriers and can be applied at lower volumetric densities, which allows for less material to be sprayed.

In another aspect, a method of suppressing weed penetration through soil is disclosed comprising: providing a sprayable non-woven fiber weed barrier comprising an aqueous solution of nonwoven fiber and polymer binder; contacting said sprayable non-woven fiber weed barrier to soil; and drying said sprayable non-woven fiber weed barrier to evaporate off water. The drying step cures the polymer binder and creates porosity in said weed barrier. The drying step can also evaporate any optional solvent present in the aqueous solution.

DETAILED DESCRIPTION

Disclosed is a sprayable nonwoven fiber weed barrier comprising an aqueous solution of nonwoven fiber and polymer binder. The nonwoven fiber comprises macroscopic particles of nonwoven material. The particles are held in suspension in the aqueous solution. The nonwoven fiber can be polypropylene, polyethylene, polyamide, or polystyrene. The macroscopic particles are formed by chopping, grinding, or pelletizing nonwoven sheet material; or spinning, blowing, wet lay-up, or spray drying a solution of nonwoven material. The macroscopic particles have an average length between about 100 microns and about 1000 microns, including between about 100 microns and about 800 microns, about 100 microns and about 500 microns, and about 100 microns and 300 microns. The macroscopic particles have an average diameter or width of between about 10 microns and about 100 microns, including about 10 microns to about 50 microns, and about 10 microns to about 25 microns. The ratio of macroscopic particle length to diameter/width is between about 1:1 to about 100:1, including about 1:1 to about 75:1, about 1:1 to about 50:1, and about 1:1 to about 25:1.

The polymer binder can comprise any type of polymer that will bind together the macroscopic particles and also cure under ambient conditions. Such binders can comprise polymers having cellulose, latex, polyethylene, polypropylene, polystyrene, paraffin wax, polyethylene glycol, polyacetal, poly methyl methaacrylate, ethylene vinyl acetate, silicone, polyamide, polyurethane, acrylic and polyethylenamine components. The polymer binder should be soluble in an aqueous solution. The aqueous solution can further including a solvent to aid in the dissolution of the polymer binder. The solvent can be organic or non-organic, polar or non-polar, including ethanol, hexane, or acetone. A surfactant can also be present in the aqueous solution to aid in dispersing the polymer binder.

The weight percent of nonwoven fiber in the aqueous solution can range from about 10% w/w to about 90% w/w, including about 20% w/w, about 30% w/w, about 40% w/w, about 50% w/w, about 60% w/w, about 70% w/w and about 80% w/w, depending on the type of polymer binder used. The aqueous solution can further comprise an addition component, including UV stabilizers, anti-microbials, fungicides, insecticides, herbicides, or colarants. These additives can also be added to the nonwoven fiber prior to formation or during formation of the macroscopic material.

The fiber weed barrier has a pore size that is large enough for water to penetrate the barrier but small enough to prevent weed penetration through the barrier. This suppresses weed growth and seed germination, thereby controlling the growth of weeds. The pore size can be between about 0.01 mm and about 1 mm, including 0.2 mm, 0.3 mm, 0.4 mm, 0.5 mm, 0.6 mm, 0.7 mm, 0.8 mm, and 0.9 mm. The fiber weed barrier can have a thickness between about 0.1 mm and about 10 mm, including about 0.5 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, and about 9.5 mm.

The sprayable nonwoven fiber weed barrier is applied to the ground or soil by contacting the aqueous solution to the ground or soil and drying the aqueous solution to evaporate off the water and any optional solvent and or surfactant. The drying cures the polymer binder and creates porosity in the seed barrier. Spraying the aqueous solution results in a random orientation of fibers, such that multiple path ways for water transport are created. The resulting weed barrier allows water to permeate the soil, but prevents the growth of seeds, weeds, and runners beneath by suppressing weed penetration through the soil.

EXAMPLES

Examples of the present disclosure are provided below.

Example 1

Nonwoven fiber particles are created by milling flash-spun polyethylene nonwoven sheet material (Tyvek 1070D, DuPont) in a Hosokawa Bantam hammermill (Hosokawa Micron Powder Systems, 10 Chatham Road, Summit, N.J. 07901, USA). Chopped sheet particles averaging 600 micron diameter are combined with a water-based polyurethane binder (Witcobond A-100) in a 20% weight ratio along with surfactant and mixed at 2000 rpm with a cowles-blade mixer for 10 minutes. Resultant fiber particle/binder dispersion is sprayed onto a cardboard surface with a gravity fed, high solids air spray gun to yield a rough-surfaced coating with approximately 1.5 mm thickness. The coating is allowed to cure at ambient conditions and contains no visibly apparent voids or holes. Water is sprayed onto the surface and moisture is visibly apparent on the backside of the cardboard surface within 10 minutes as evidence that moisture is transmitted through the physically continuous membrane.

Example 2

A similar experiment to Example 1 is performed using 2 oz/sqyd spunbond polypropylene (Oxco Corp, Charlotte, N.C.) and provides near identical results.

While the foregoing invention has been described in some detail for purposes of clarity and understanding, it will be appreciated by one skilled in the art from a reading of this disclosure that various changes in form and detail can be made without departing from the true scope of the invention and appended claims.

What we claim is:

1. A solid, porous weed barrier:
   wherein the solid barrier is formed by spraying an aqueous solution of nonwoven fiber macroscopic particles and polymer binder;
   wherein the solid barrier contains pores ranging in size between about 0.01 mm and about 1 mm;
   wherein the pores of the solid barrier are formed after contacting the aqueous solution with soil and allowing the aqueous solution to solidify by curing under ambient conditions;
   wherein the microscopic particles in the solid barrier form a random orientation of fibers;
   wherein the microscopic particles have an average length of between about 100 microns and about 1000 microns;
   wherein the barrier contains no visibly apparent voids or holes; and
   wherein the formed barrier is sufficiently solid to be a physical barrier to weed growth and sufficiently porous to allow water to penetrate through the solid barrier.

2. The barrier of claim 1, wherein said macroscopic particles have an average length of between about 100 microns and about 500 microns.

3. The barrier of claim 1, wherein said macroscopic particles have a ratio of length to diameter of between about 1:1 to about 100:1.

4. The barrier of claim 1, wherein said polymer binder comprises a component selected from the group consisting of: cellulose, latex, polyethylene, polypropylene, polystyrene, paraffin wax, polyethylene glycol, polyacetal, polymethylmethacrylate, ethylene vinyl acetate, silicone, polyamide, polyurethane, acrylic and polyethylenamine.

5. The barrier of claim 1, wherein said aqueous solution further comprises a solvent.

6. The barrier of claim 5, wherein said solvent is an organic solvent.

7. The barrier of claim 1, wherein the thickness of the barrier is between about 0.1 mm and about 10 mm.

\* \* \* \* \*